(12) United States Patent
Huang

(10) Patent No.: US 7,650,992 B1
(45) Date of Patent: Jan. 26, 2010

(54) COMBINATION OF GARDENING SHEARS AND SUSPENSION RACK TO PROVIDE EXHIBITION FUNCTION

(75) Inventor: Yao-Chung Huang, Changhua Hsien (TW)

(73) Assignee: Ho Cheng Garden Tools Co., Ltd., Changhua Hsien (TW)

( * ) Notice: Subject to any disclaimer, the term of this patent is extended or adjusted under 35 U.S.C. 154(b) by 53 days.

(21) Appl. No.: 12/014,351

(22) Filed: Jan. 15, 2008

(51) Int. Cl.
*A45C 11/26* (2006.01)
(52) U.S. Cl. .................. 206/349; 206/477; 206/806
(58) Field of Classification Search .................. 206/349, 206/477, 493, 461, 471, 806; 30/254; 211/60.1, 211/70.7, 85.29, 113
See application file for complete search history.

(56) References Cited

U.S. PATENT DOCUMENTS 4,165,805 A * 8/1979 Fethke et al. ................ 206/349
4,714,159 A * 12/1987 Linden ........................ 206/349
5,595,295 A * 1/1997 Lin ............................. 206/349
6,671,967 B1 * 1/2004 Huang ......................... 30/254
6,681,932 B2 * 1/2004 Bradfield .................... 206/349
2002/0100704 A1 * 8/2002 Huang ........................ 206/349
2005/0035013 A1 * 2/2005 Bates et al. ................. 206/349

* cited by examiner

Primary Examiner—Luan K Bui
(74) Attorney, Agent, or Firm—Alan Kamrath; Kamrath & Associates PA

(57) ABSTRACT

A combination of a pair of gardening shears and a suspension rack includes a suspension rack, and a pair of gardening shears detachably mounted on the suspension rack. The gardening shears include two blade portions each having a distal end provided with a sharp portion. The suspension rack includes a support plate, a locking post, and a safety guard. Thus, the sharp portion of each of the two blade portions of the gardening shears is fully hidden in and surrounded by the safety guard of the suspension rack so that the safety guard of the suspension rack provides an isolating function to prevent a consumer's hand from directly touching the sharp portion of each of the two blade portions of the gardening shears so as to protect the consumer's safety.

12 Claims, 6 Drawing Sheets

COMBINATION OF GARDENING SHEARS AND SUSPENSION RACK TO PROVIDE EXHIBITION FUNCTION

BACKGROUND OF THE INVENTION

1. Field of the Invention

The present invention relates to a pair of gardening shears and, more particularly, to a pair of gardening shears having an exhibition function.

2. Description of the Related Art

A pair of gardening shears comprise two blade portions pivotally connected with each other and each having a distal end provided with a sharp portion. For exhibition or sale, a plastic film is coated around the two blade portions of the gardening shears to isolate the two blade portions of the gardening shears so as to prevent a consumer's hand from directly touching the sharp portion of each of the two blade portions of the gardening shears and to protect the consumer's safety. However, the sharp portion of each of the two blade portions of the gardening shears easily pierces or penetrates the plastic film due to vibration or shock, thereby causing danger to the consumer. In addition, the two blade portions of the gardening shears are limited by the plastic film, so that the gardening shears cannot be hung on an exhibition rack for display.

BRIEF SUMMARY OF THE INVENTION

In accordance with the present invention, there is provided a combination of a pair of gardening shears and a suspension rack, comprising a suspension rack, and a pair of gardening shears detachably mounted on the suspension rack. The gardening shears include two blade portions each having a distal end provided with a sharp portion, and one of the two blade portions of the gardening shears is provided with a fixing hole. The suspension rack includes a support plate to support the two blade portions of the gardening shears, a locking post mounted on the support plate and fixed in the fixing hole of the respective blade portion of the gardening shears to fix the respective blade portion of the gardening shears onto the support plate, and a safety guard mounted on the support plate to cover the sharp portion of each of the two blade portions of the gardening shears.

The primary objective of the present invention is to provide a combination of a pair of gardening shears and a suspension rack to present an exhibition function.

Another objective of the present invention is to provide a combination of a pair of gardening shears and a suspension rack, wherein the sharp portion of each of the two blade portions of the gardening shears is fully hidden in and surrounded by the safety guard of the suspension rack so that the safety guard of the suspension rack provides an isolating function to prevent a consumer's hand from directly touching the sharp portion of each of the two blade portions of the gardening shears so as to protect the consumer's safety.

A further objective of the present invention is to provide a combination of a pair of gardening shears and a suspension rack, wherein the hanging hole of the support plate of the suspension rack is mounted on an exhibition bar to provide a display function so that the gardening shears can be exhibited for purchase of the consumer.

A further objective of the present invention is to provide a combination of a pair of gardening shears and a suspension rack, wherein the respective blade portion of the gardening shears is locked onto and detached from the locking post of the suspension rack by compressing the stop flange of the locking post, so that the gardening shears can be mounted on and removed from the suspension rack easily and quickly.

A further objective of the present invention is to provide a combination of a pair of gardening shears and a suspension rack, wherein the gardening shears can be mounted on and removed from the suspension rack by compressing the stop flange of the locking post without having to break the locking post of the suspension rack, so that the suspension rack can be used successively.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
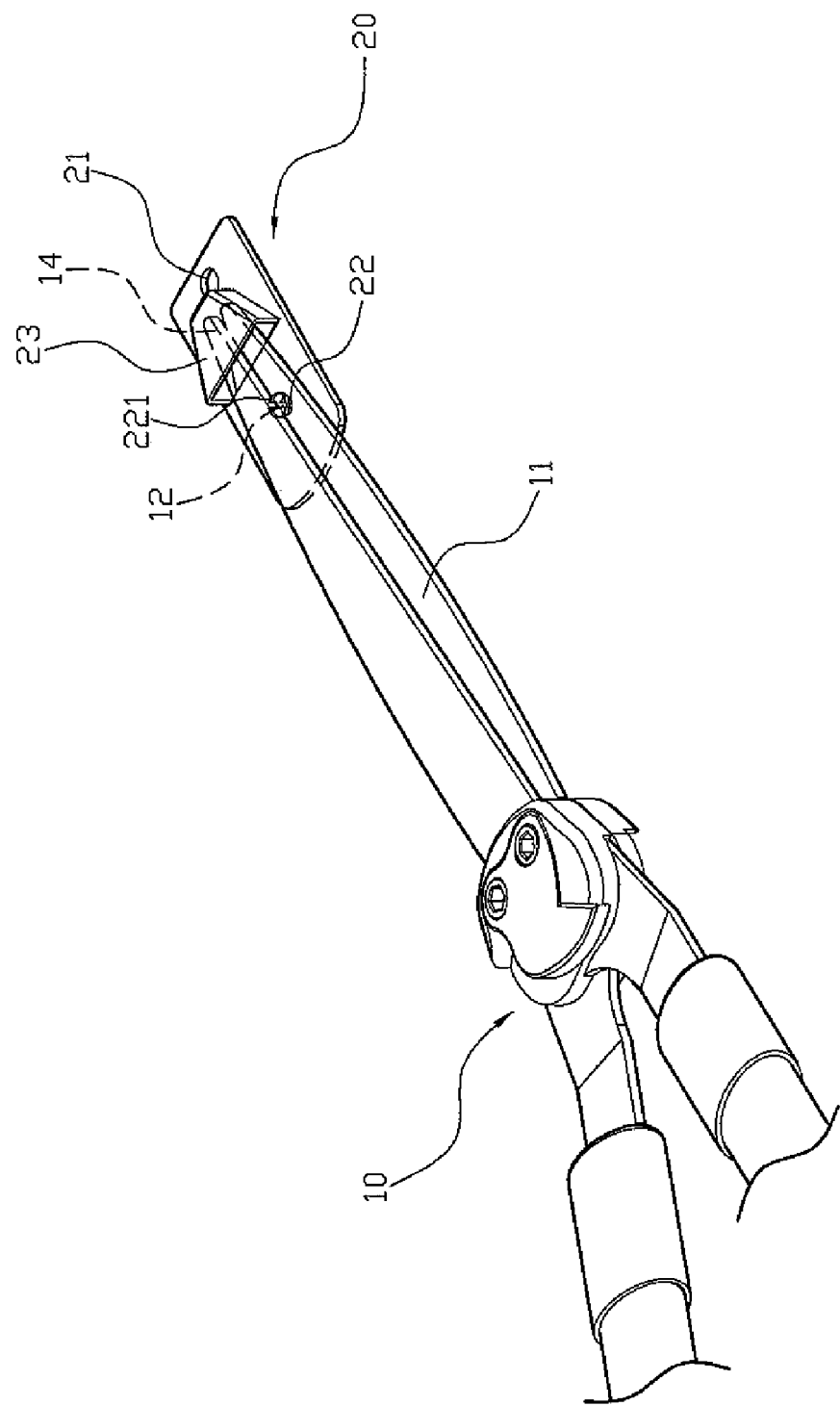
FIG. 1 is a perspective view of a combination of a pair of gardening shears and a suspension rack in accordance with the preferred embodiment of the present invention.
Figure 2:
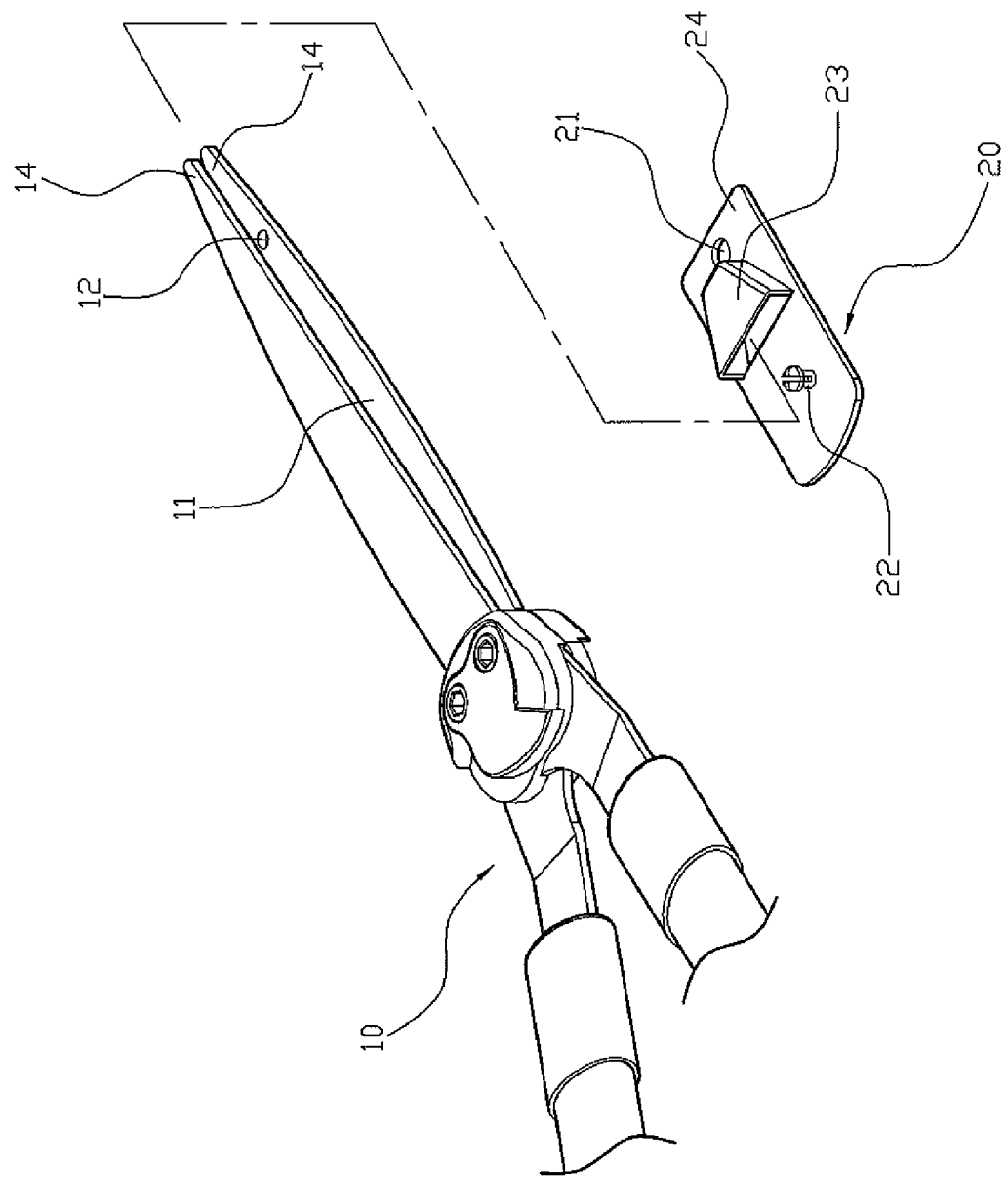
FIG. 2 is an exploded perspective view of the combination of a pair of gardening shears and a suspension rack as shown in FIG. 1.
Figure 3:
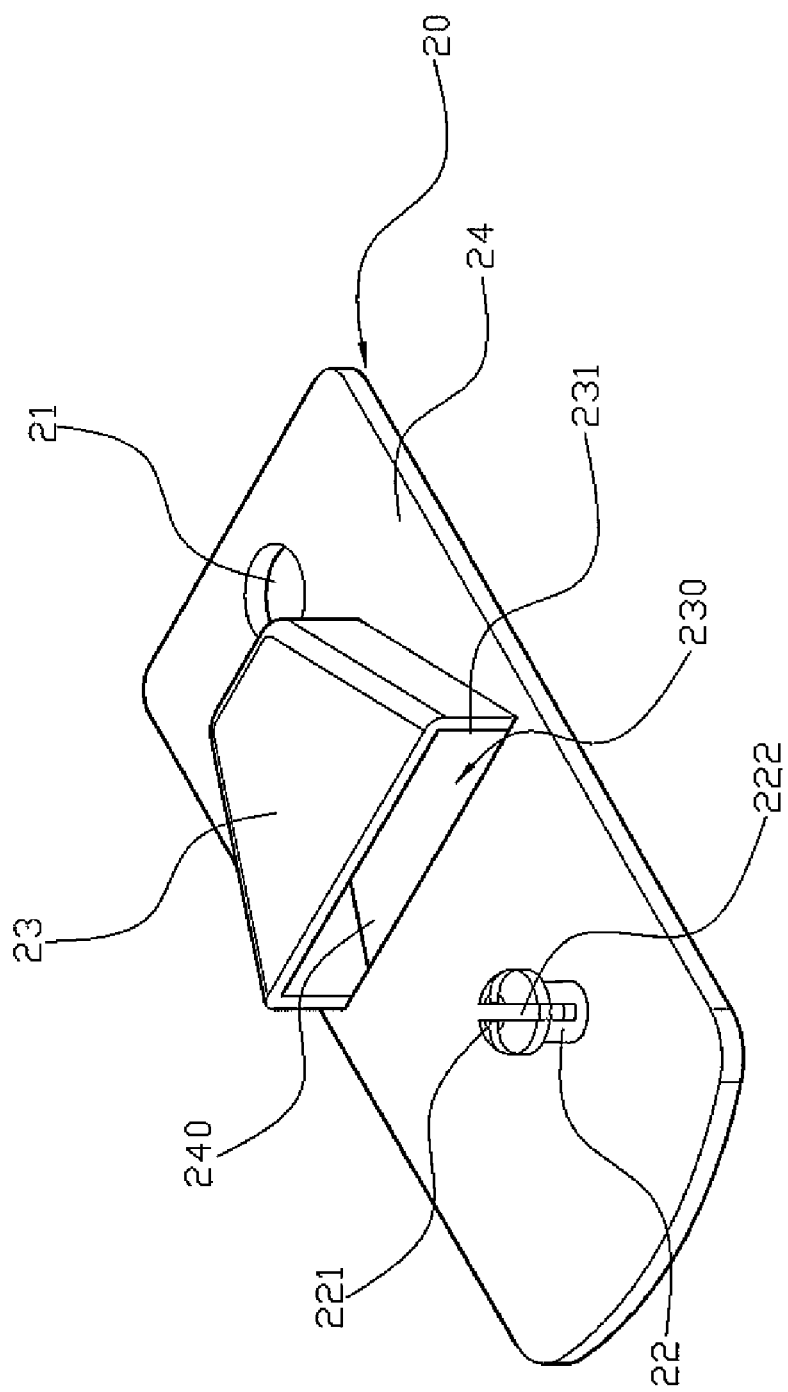
FIG. 3 is a perspective view of a suspension rack of the combination as shown in FIG. 1.
Figure 4:
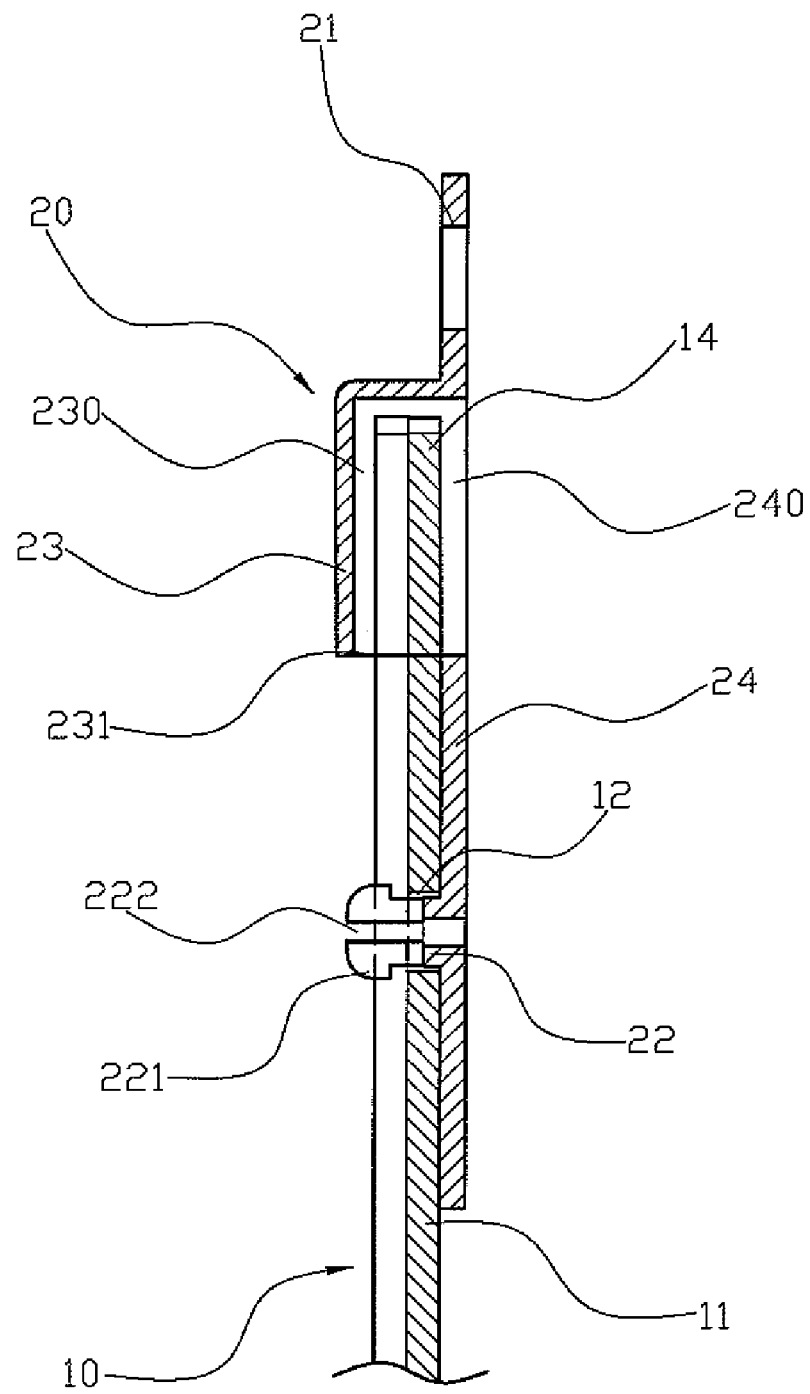
FIG. 4 is a side cross-sectional view of the combination of a pair of gardening shears and a suspension rack as shown in FIG. 1.

Referring to the drawings and initially to FIGS. 1-4, a combination of a pair of gardening shears and a suspension rack in accordance with the preferred embodiment of the present invention comprises a suspension rack 20, and a pair of gardening shears 10 detachably mounted on the suspension rack 20.

The gardening shears 10 include two blade portions 11 pivotally connected with each other and each having a distal end provided with a sharp portion 14. One of the two blade portions 11 of the gardening shears 10 is provided with a fixing hole 12. The fixing hole 12 of the gardening shears 10 extends through a whole thickness of the respective blade portion 11 and is spaced from the sharp portion 14 of the respective blade portion 11 with a determined distance.

The suspension rack 20 includes a support plate 24 to support the two blade portions 11 of the gardening shears 10, a locking post 22 mounted on the support plate 24 and fixed in the fixing hole 12 of the respective blade portion 11 of the gardening shears 10 to fix the respective blade portion 11 of the gardening shears 10 onto the support plate 24, and a safety guard 23 mounted on the support plate 24 to cover the sharp portion 14 of each of the two blade portions 11 of the gardening shears 10.

The support plate 24 of the suspension rack 20 is provided with a hanging hole 21 and has a surface provided with a passage 240 connected to the safety guard 23 to allow passage of the sharp portion 14 of each of the two blade portions 11 of the gardening shears 10. The passage 240 extends through a whole thickness of the support plate 24 of the suspension rack 20.

The safety guard 23 of the suspension rack 20 is made of hard material and is located between the locking post 22 and the hanging hole 21 of the support plate 24. The safety guard 23 of the suspension rack 20 has a hollow inside provided with a receiving chamber 230 connected to the passage 240 of the support plate 24 to receive the sharp portion 14 of each of the two blade portions 11 of the gardening shears 10 so that the sharp portion 14 of each of the two blade portions 11 of the gardening shears 10 is fully hidden in and surrounded by the receiving chamber 230 of the safety guard 23 of the suspension rack 20. The safety guard 23 of the suspension rack 20 has a side provided with an opening 231 connected to the receiving chamber 230 and facing the locking post 22 to allow entrance of the sharp portion 14 of each of the two blade portions 11 of the gardening shears 10.

The locking post 22 of the suspension rack 20 has a first end protruding from the support plate 24, a mediate portion fixed in the fixing hole 12 of the respective blade portion 11 of the gardening shears 10 and a second end provided with an enlarged circular stop flange 221 abutting a face of the respective blade portion 11 of the gardening shears 10 to prevent the respective blade portion 11 of the gardening shears 10 from being detached from the locking post 22. The locking post 22 of the suspension rack 20 is provided with a cross-shaped slit 222 extending through the stop flange 221 so that the stop flange 221 is made flexible and is compressible radially and inwardly to pass through the fixing hole 12 of the respective blade portion 11 of the gardening shears 10 to detach the respective blade portion 11 of the gardening shears 10 from the locking post 22.

Figure 5:
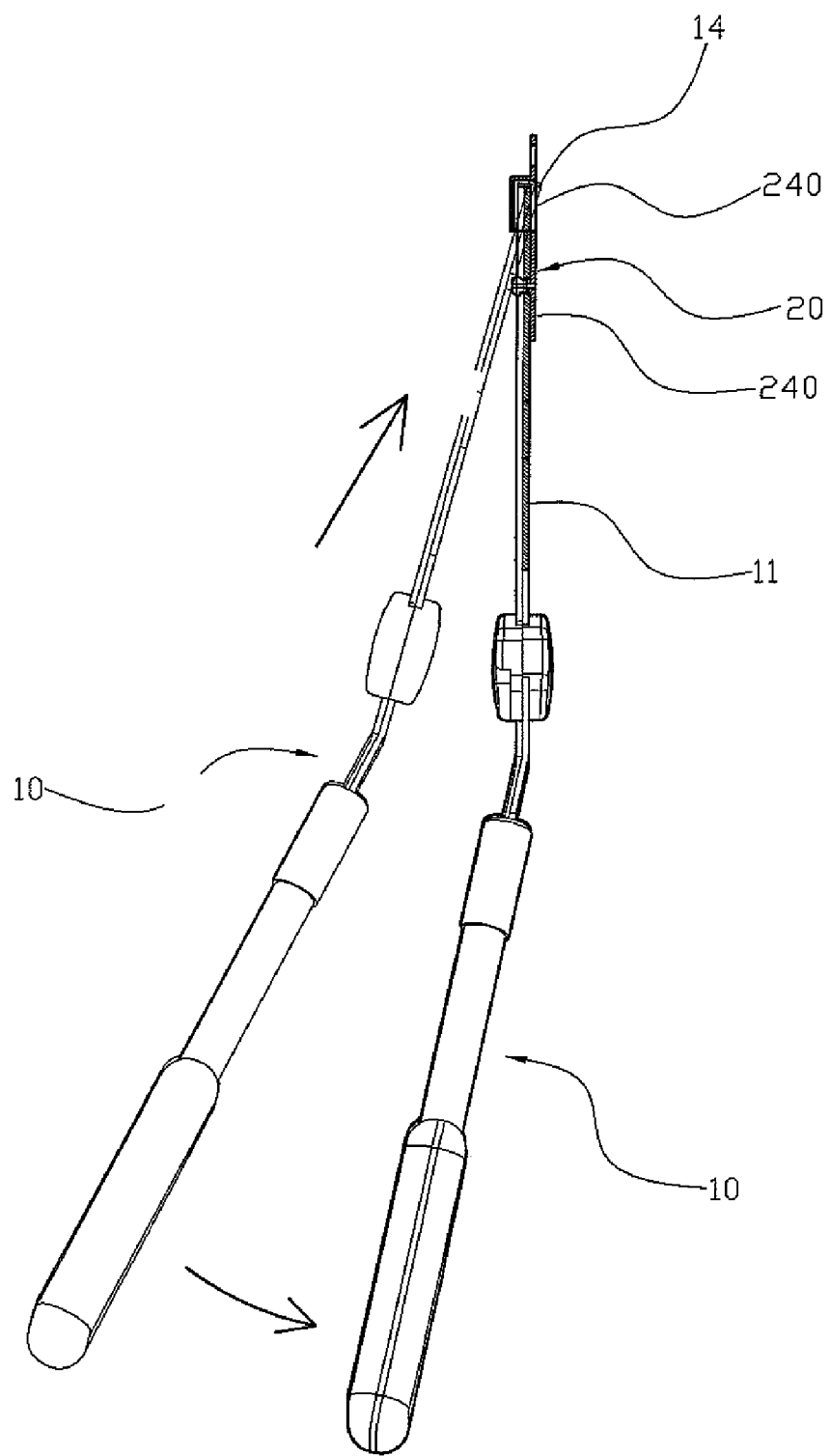
FIG. 5 is a side cross-sectional operational view of the combination of a pair of gardening shears and a suspension rack as shown in FIG. 1.

In assembly, referring to FIG. 5 with reference to FIGS. 1-4, the sharp portion 14 of each of the two blade portions 11 of the gardening shears 10 extends through the opening 231 into the receiving chamber 230 of the safety guard 23 of the suspension rack 20 and passes through the passage 240 of the support plate 24 of the suspension rack 20 in an oblique manner to prevent the safety guard 23 of the suspension rack 20 from interfering with each of the two blade portions 11 of the gardening shears 10. After the fixing hole 12 of the respective blade portion 11 of the gardening shears 10 aligns with the locking post 22 of the suspension rack 20, the respective blade portion 11 of the gardening shears 10 is pressed toward the locking post 22 of the suspension rack 20 to compress the stop flange 221 of the locking post 22 by the fixing hole 12 of the respective blade portion 11 so that the stop flange 221 of the locking post 22 is compressible radially and inwardly to pass through the fixing hole 12 of the respective blade portion 11. Then, the stop flange 221 of the locking post 22 is expandable radially and outwardly by its flexibility to abut and stop the face of the respective blade portion 11 of the gardening shears 10 so as to prevent the respective blade portion 11 of the gardening shears 10 from being detached from the locking post 22 of the suspension rack 20, thereby locking the respective blade portion 11 of the gardening shears 10 onto the locking post 22 of the suspension rack 20.

Figure 6:
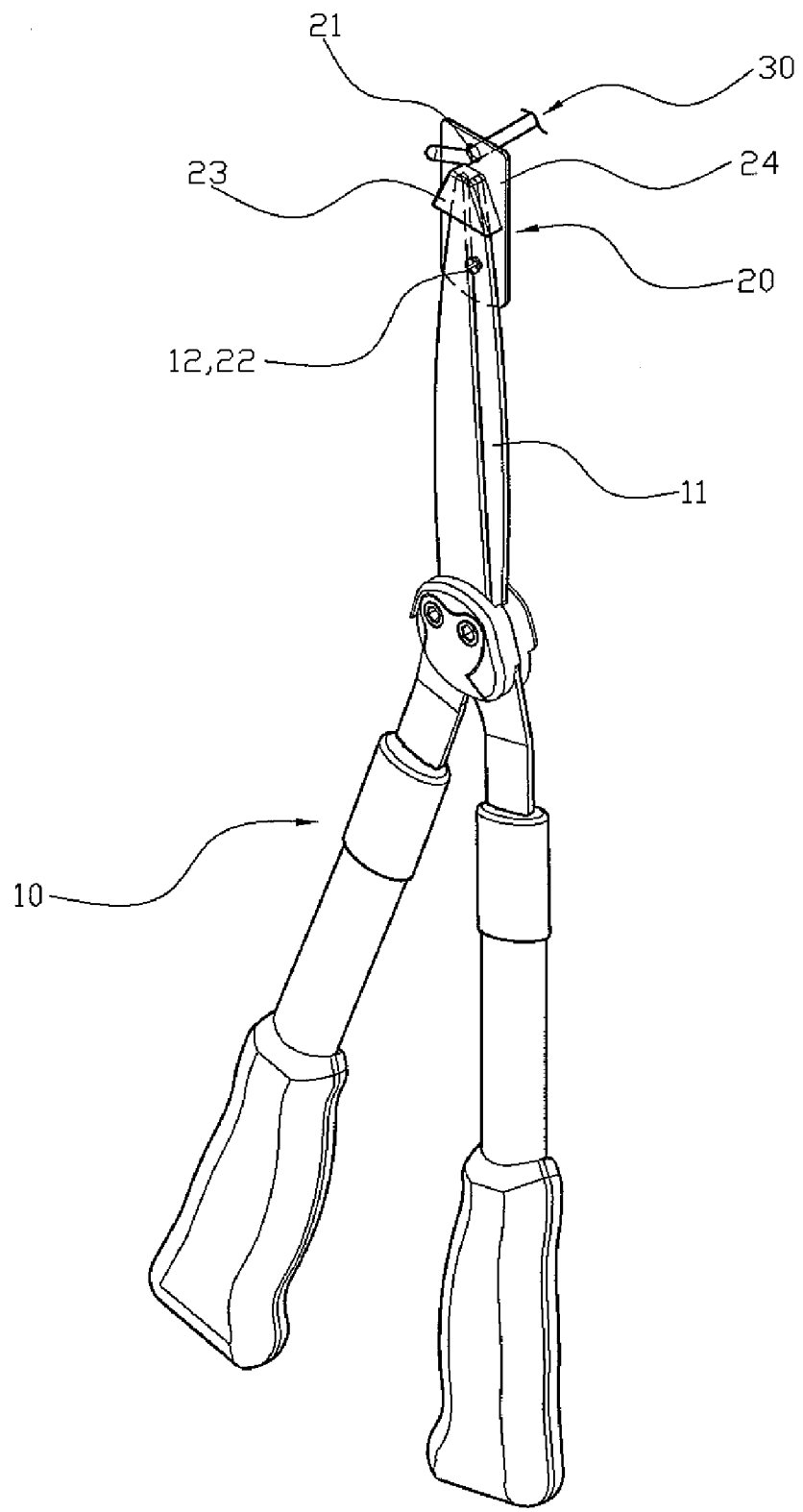
FIG. 6 is a perspective view showing the combination being mounted on an exhibition bar.

As shown in FIG. 6, the hanging hole 21 of the support plate 24 of the suspension rack 20 is mounted on an exhibition bar 30 to provide a display function.

Accordingly, the sharp portion 14 of each of the two blade portions 11 of the gardening shears 10 is fully hidden in and surrounded by the safety guard 23 of the suspension rack 20 so that the safety guard 23 of the suspension rack 20 provides an isolating function to prevent a consumer's hand from directly touching the sharp portion 14 of each of the two blade portions 11 of the gardening shears 10 so as to protect the consumer's safety. In addition, the hanging hole 21 of the support plate 24 of the suspension rack 20 is mounted on an exhibition bar 30 to provide a display function so that the gardening shears 10 can be exhibited for purchase of the consumer. Further, the respective blade portion 11 of the gardening shears 10 is locked onto and detached from the locking post 22 of the suspension rack 20 by compressing the stop flange 221 of the locking post 22, so that the gardening shears 10 can be mounted on and removed from the suspension rack 20 easily and quickly. Further, the gardening shears 10 can be mounted on and removed from the suspension rack 20 by compressing the stop flange 221 of the locking post 22 without having to break the locking post 22 of the suspension rack 20 so that the suspension rack 20 can be used successively.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A combination of a pair of gardening shears and a suspension rack, comprising:
    a suspension rack;
    a pair of gardening shears detachably mounted on the suspension rack; wherein
    the gardening shears include two blade portions each having a distal end provided with a sharp portion;
    one of the two blade portions of the gardening shears is provided with a fixing hole;
    the suspension rack includes:
    a support plate to support the two blade portions of the gardening shears;
    a locking post mounted on the support plate and fixed in the fixing hole of the respective blade portion of the gardening shears to fix the respective blade portion of the gardening shears onto the support plate;
    a safety guard mounted on the support plate to cover the sharp portion of each of the two blade portions of the gardening shears;
    the locking post of the suspension rack has a first end protruding from the support plate, a mediate portion fixed in the fixing hole of the respective blade portion of the gardening shears and a second end provided with an enlarged circular stop flange abutting a face of the respective blade portion of the gardening shears to prevent the respective blade portion of the gardening shears from being detached from the locking post.

2. The combination of a pair of gardening shears and a suspension rack in accordance with claim 1, wherein the support plate of the suspension rack is provided with a hanging hole.

3. The combination of a pair of gardening shears and a suspension rack in accordance with claim 2, wherein the safety guard of the suspension rack is located between the locking post and the hanging hole of the support plate.

4. The combination of a pair of gardening shears and a suspension rack in accordance with claim 1, wherein the sharp portion of each of the two blade portions of the gardening shears is fully hidden in and surrounded by the receiving chamber of the safety guard of the suspension rack.

5. The combination of a pair of gardening shears and a suspension rack in accordance with claim 1, wherein the locking post of the suspension rack is provided with a cross-shaped slit extending through the stop flange so that the stop flange is made flexible and is compressible radially and inwardly to pass through the fixing hole of the respective blade portion of the gardening shears to detach the respective blade portion of the gardening shears from the locking post.

6. The combination of a pair of gardening shears and a suspension rack in accordance with claim 1, wherein when the fixing hole of the respective blade portion of the gardening shears aligns with the locking post of the suspension rack, the respective blade portion of the gardening shears is pressed toward the locking post of the suspension rack to compress the stop flange of the locking post by the fixing hole of the respective blade portion so that the stop flange of the locking post is compressible radially and inwardly to pass through the fixing hole of the respective blade portion.

7. The combination of a pair of gardening shears and a suspension rack in accordance with claim 6, wherein the respective blade portion of the gardening shears is locked onto and detached from the locking post of the suspension rack by compressing the stop flange of the locking post.

8. The combination of a pair of gardening shears and a suspension rack in accordance with claim 1, wherein the fixing hole of the gardening shears extends through a whole thickness of the respective blade portion.

9. The combination of a pair of gardening shears and a suspension rack in accordance with claim 1, wherein the fixing hole of the gardening shears is spaced from the sharp portion of the respective blade portion with a determined distance.

10. The combination of a pair of gardening shears and a suspension rack in accordance with claim 1, wherein the safety guard of the suspension rack is made of hard material.

11. A combination of a pair of gardening shears and a suspension rack, comprising:
   a suspension rack;
   a pair of gardening shears detachably mounted on the suspension rack; wherein
   the gardening shears include two blade portions each having a distal end provided with a sharp portion;
   one of the two blade portions of the gardening shears is provided with a fixing hole;
   the suspension rack includes:
   a support plate to support the two blade portions of the gardening shears;
   a locking post mounted on the support plate and fixed in the fixing hole of the respective blade portion of the gardening shears to fix the respective blade portion of the gardening shears onto the support plate;
   a safety guard mounted on the support plate to cover the sharp portion of each of the two blade portions of the gardening shears;
   the support plate of the suspension rack has a surface provided with a passage connected to the safety guard to allow passage of the sharp portion of each of the two blade portions of the gardening shears;
   the safety guard of the suspension rack has a hollow inside provided with a receiving chamber connected to the passage of the support plate to receive the sharp portion of each of the two blade portions of the gardening shears;
   the safety guard of the suspension rack has a side provided with an opening connected to the receiving chamber and facing the locking post to allow entrance of the sharp portion of each of the two blade portions of the gardening shears;
   the sharp portion of each of the two blade portions of the gardening shears extends through the opening into the receiving chamber of the safety guard of the suspension rack and passes through the passage of the support plate of the suspension rack in an oblique manner to prevent the safety guard of the suspension rack from interfering with each of the two blade portions of the gardening shears.

12. The combination of a pair of gardening shears and a suspension rack in accordance with claim 11, wherein the passage extends through a whole thickness of the support plate of the suspension rack.

\* \* \* \* \*